United States Patent [19]

Gregg

[11] Patent Number: 5,044,813
[45] Date of Patent: Sep. 3, 1991

[54] BUSH TYPE HYDRAULICALLY DAMPED ENGINE OR TRANSMISSION MOUNT

[75] Inventor: Michael J. W. Gregg, Lincoln, Nebr.

[73] Assignee: The Goodyear Tire & Rubber Company, Akron, Ohio

[21] Appl. No.: 148,467

[22] Filed: Jan. 26, 1988

[51] Int. Cl.⁵ .............................................. F16F 5/00
[52] U.S. Cl. ................................. 403/225; 267/140.1
[58] Field of Search ............... 267/140.1, 141.4, 141.1, 267/141, 219; 248/562, 636; 403/34, 37, 221, 225, 228

[56] References Cited

U.S. PATENT DOCUMENTS

| | | | |
|---|---|---|---|
| 4,605,207 | 8/1986 | Konishi | 403/225 X |
| 4,700,931 | 10/1987 | Eberhard et al. | 267/140.1 X |
| 4,705,410 | 11/1987 | von Broock | 267/219 X |
| 4,717,111 | 1/1988 | Saito | 267/140.1 X |
| 4,728,086 | 3/1988 | Ishiyama et al. | 267/140.1 |
| 4,749,174 | 6/1988 | Kanda | 267/140.1 |
| 4,756,514 | 7/1988 | Kanda | 248/562 X |
| 4,768,760 | 9/1988 | Le Fol | 267/140.1 |

FOREIGN PATENT DOCUMENTS

| | | | |
|---|---|---|---|
| 0172743 | 9/1985 | Japan | 267/140.1 |
| 0206838 | 9/1986 | Japan | 267/140.1 |

*Primary Examiner*—Peter M. Cuomo
*Attorney, Agent, or Firm*—Marc R. Dion, Sr.

[57] ABSTRACT

A bush type mounting device having an outer sleeve (42), an intermediate sleeve (21) and an inner tubular metal portion (12) with a rubber spring (16) connected between the intermediate sleeve (21) and the inner tubular metal portion (12) diametrically dividing the intermediate sleeve (21) into an upper fluid chamber (32) and a lower fluid chamber (30), an inertial damping channel (36) between the outer sleeve (42) and the intermediate sleeve (21) connecting the chambers and an internal hydraulic decoupling device (26) located between the chambers.

8 Claims, 2 Drawing Sheets 5,044,813

BUSH TYPE HYDRAULICALLY DAMPED ENGINE OR TRANSMISSION MOUNT

FIELD OF THE INVENTION

This invention relates to bush type mounting devices. More particularly, this invention relates to hydraulically damped bush type mounting devices. Most particularly, this invention describes a hydraulically damped bushing which utilizes inertial port damping and internal damping decoupling for small amplitudes.

BACKGROUND OF THE INVENTION

A hydraulically damped mounting device is known in which the anchor part for one part of the vibrating machinery is in the form of a hollow sleeve with the other anchor part in the form of a rod or tube extending approximately centrally and coaxially of the sleeve. Resilient walls then join the sleeve and the tube and define two chambers connected by a passageway. The chambers are filled with hydraulic fluid, and the movement of the fluid from one chamber to the other through the passageway damps the vibration of the parts of the machinery attached to the respective anchor points.

Mounting devices of this type, in which there is a first anchor part, for example in the form of a tube, within a second anchor part in the form of a sleeve, with the sleeve and tube being connected by resilient walls, are desirable because they permit a compact construction, all parts being enclosed within the sleeve. This design, employing orifice damping via a short passage between the upper and lower fluid chambers would not allow a long tuned fluid column between the chambers to oscillate in the laminar flow region, thus would contribute to noise transmission.

Another device is known wherein a long damping channel has been provided to dampen low frequency high amplitude vibrations. At one end of the damping channel there is provided a diaphragm bellows displacement chamber to move the fluid through the channel as opposed to moving the spring rubber for the displacement. This bellows plays no part in the springing action of the mount. The device also employs a high frequency external decoupler between the damping fluid and the atmosphere. This type of external decoupler not only requires the employment of an adequate seal to prevent leakage of the fluid through the diaphragm used in the decoupler, but also fails to provide for the positive pressure of fluid to counteract the high frequency vibrations occurring in the device, rather relying upon the negative pressure for vacuum created as the fluid moves away from the diaphragm of the decoupler. In addition, the existence of the external decoupler contributes to the greater bulkiness of the device.

It is therefore an object of the present invention to provide a bush type mounting device having a more compact and simpler construction. It is a further object of the invention to provide a bush type mounting device with inertial hydraulic damping. It is a still further object of the present invention to provide such a device with high frequency decoupling.

The objects have been met in accordance with the present invention by providing a bush type mounting device having inertial hydraulic damping and internal hydraulic decoupling. Such a device comprising an outer sleeve: and intermediate sleeve radially inward from said outer sleeve defining an annular space therebetween; an inner metal portion formed within the intermediate sleeve; a rubber spring bonded to an outer surface of the inner metal on one side of the rubber spring and to an inner surface of the intermediate sleeve on another side of the rubber spring, diametrically located to divide the intermediate sleeve into a lower fluid chamber and an upper fluid chamber, each containing a fluid: an inertial damping channel located within the annular space: and a means for hydraulically decoupling the fluid between the lower chamber and the upper chamber.

DETAILED DESCRIPTION OF THE INVENTION

Figure 1:
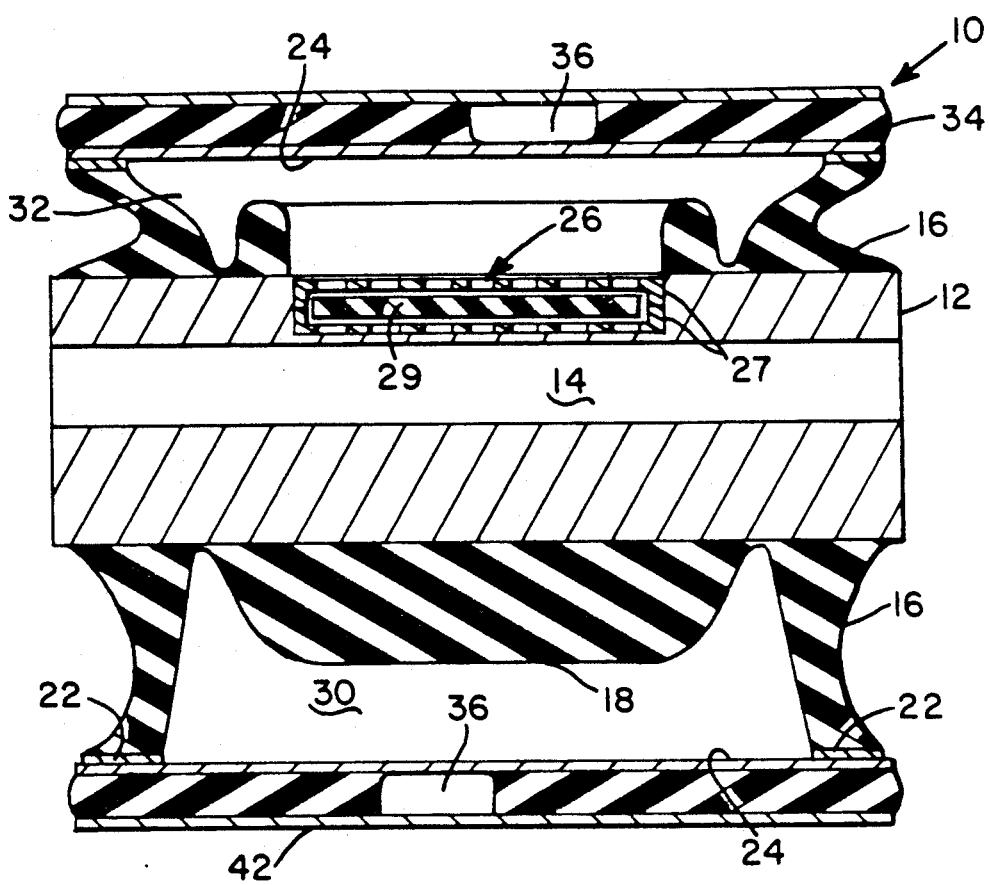
FIG. 1 is an axial cross sectional view of the bush type mount of the present invention.
Figure 2:
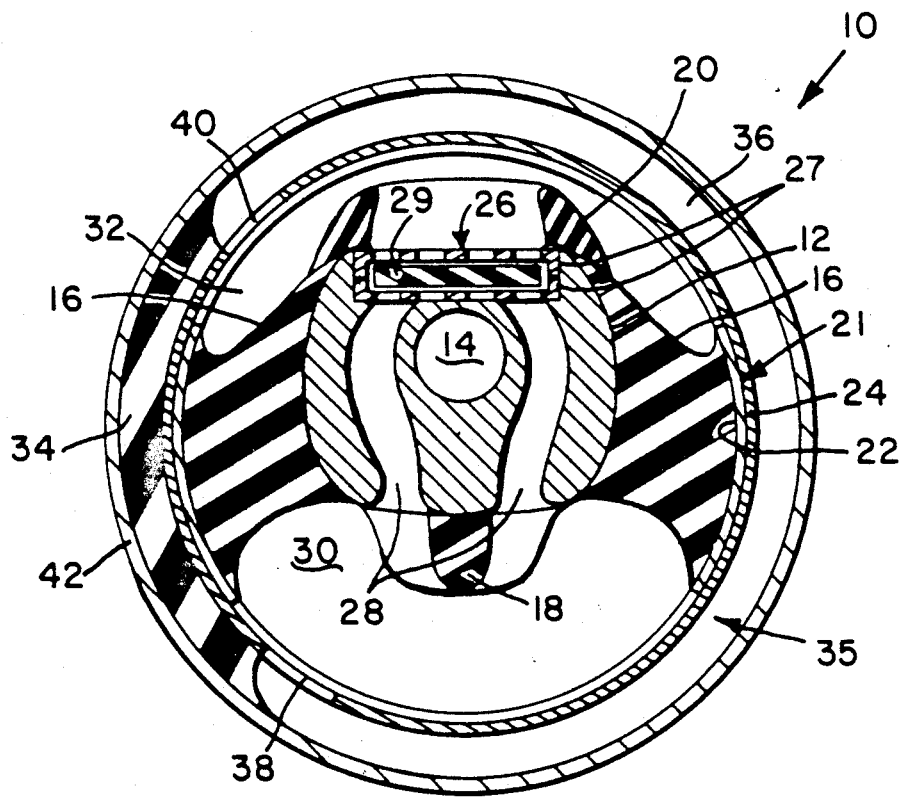
FIG. 2 is a radial cross section of the bush type mount of the present invention.

The drawings illustrate a bush type mounting device shown generally at 10, having inertial hydraulic damping and internal hydraulic decoupling and comprising:

an outer sleeve (42);

an intermediate sleeve (21), radially inward from said outer sleeve (42) defining an annular space (35) therebetween;

an inner metal (12) portion formed within said intermediate sleeve (21);

a rubber spring bonded to an outer surface of said inner metal (12) on one side of said rubber spring (16) and to an inner surface of said intermediate sleeve (21) on another side of said rubber spring (16) diametrically located to divide said intermediate sleeve (21) into a lower fluid chamber (30) and an upper fluid chamber (32), each containing a fluid;

an inertial damping channel (36) located within said annular space (35); and means for hydraulically decoupling (26) said fluid between said lower chamber (30) and said upper chamber (32).

The inner metal portion (12) is generally tubular in shape, oriented axially within the intermediate sleeve (21), has an aperture (14) therethrough in its axial direction and has a decoupling channel (28) connecting the lower fluid chamber (30) and the upper fluid chamber (32).

Figure 3:
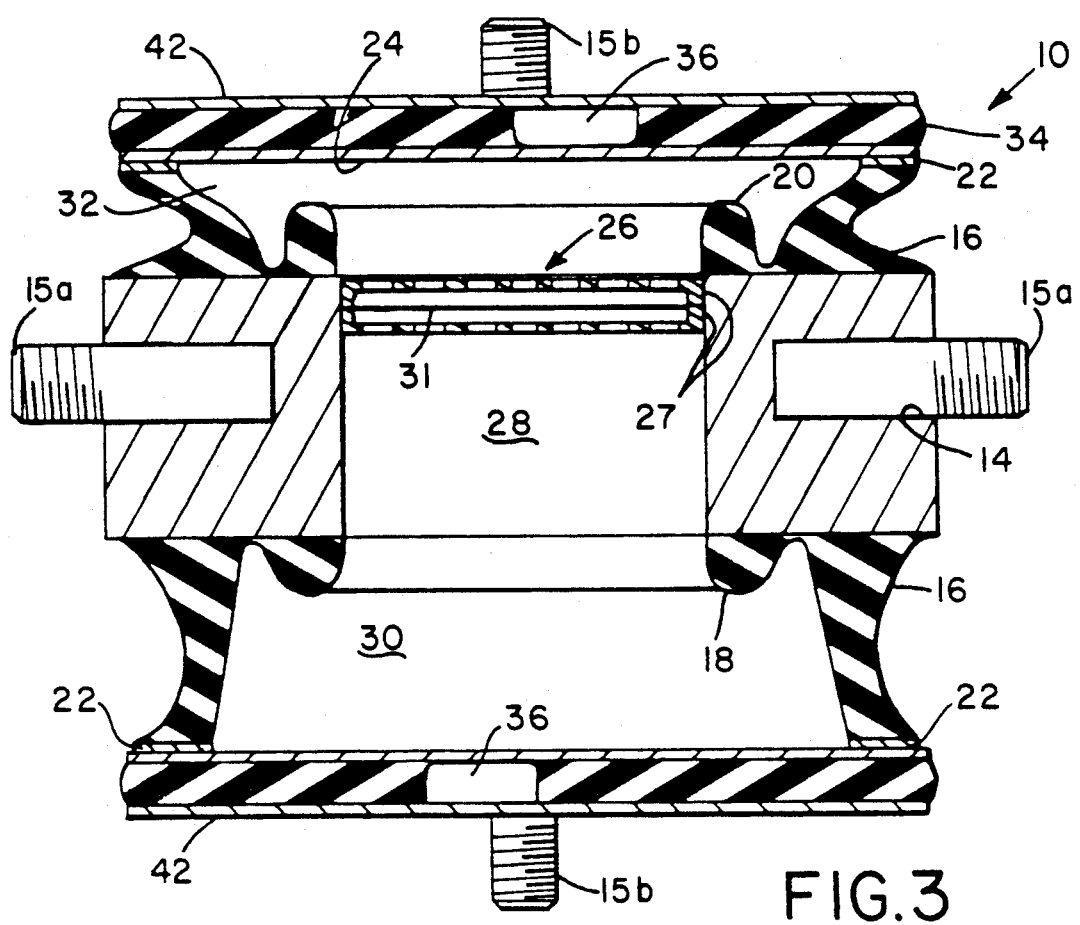
FIGS. 3 and 4 illustrate cross sectional views of an alternate embodiment corresponding to FIGS. 1 and 2 respectively.
Figure 4:
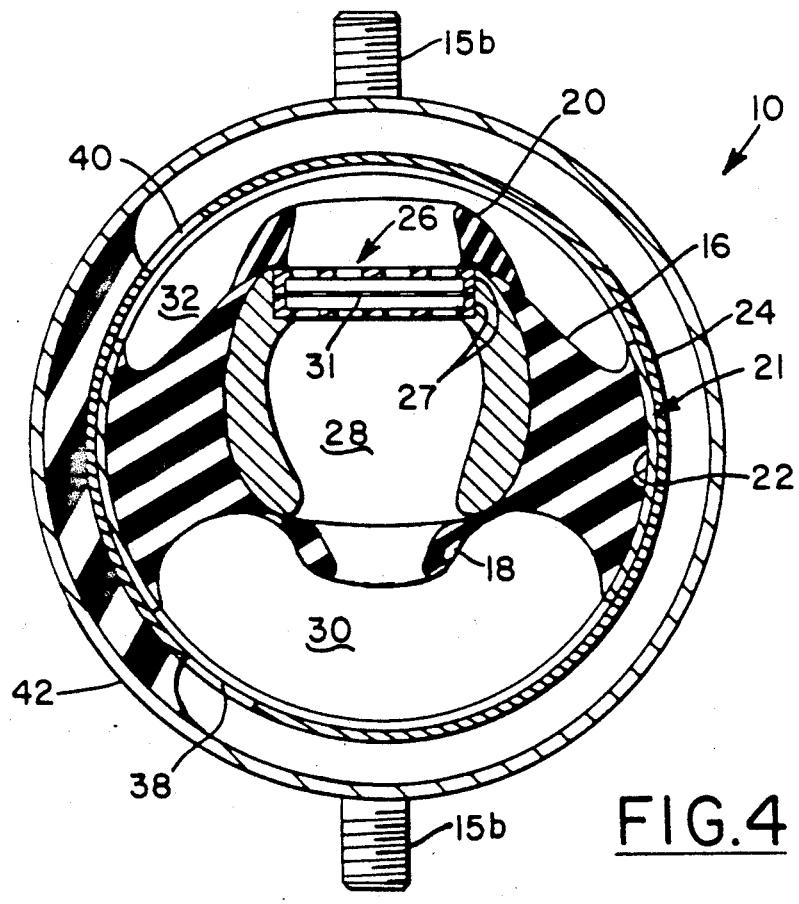

The aperture (14) in the inner metal (12) portion can serve to receive a mounting bolt from an object whose vibrations are to be isolated. Alternatively, a stud or studs (15a) could project from the aperture (14) for mounting purposes as illustrated in FIG. 3. The outer periphery of the outer sleeve is used as the other attachment point by the use of clamps or mounting lugs (15b).

The means for hydraulically decoupling (26) is located at one end of the decoupling channel (28) and is made from a pair of perforated plates (27) which are separated by a gap and a rubber plate (29) which is thinner than the gap and is located therein.

FIG. 3 illustrates an alternative embodiment wherein the decoupler comprises diaphragm (31) held between perforated plates (27).

The hydraulic decoupler serves to absorb vibrations which are of a small amplitude but high frequency through the movement of the rubber plate (29) or diaphragm (31) between the perforated plates (27). The internal decoupler of the present invention is felt to be a particular benefit in a bush type mounting device due to the positive fluid pressure which is acting against the opposed sides of the rubber plate (29) or diaphragm (31). This is in contrast to an external decoupler which must rely upon the negative pressure or vacuum created as the fluid moves away from the decoupler assembly.

It is preferred that the bush type mounting device also include a lower bump stop (18) and an upper bump stop (20) which serve to protect the mounting device should extreme amplitude vibrations occur. The bump stops are generally constructed as a continuation of the rubber spring (16).

The intermediate sleeve (21) is constructed of an inner intermediate sleeve (22) and an outer intermediate sleeve (24). The inner intermediate sleeve (22) is generally cylindrical in shape having two rings at each end of the cylinder with rectangular windows cut out from the bottom and top diametrically opposed surfaces to allow for the construction of the inner intermediate sleeve, inner metal and rubber spring combination. This is generally accomplished in one molding operation. Both ends of the inner intermediate sleeve consists of complete rings, the outer surface of which is covered in rubber. This is used to seal the inner intermediate sleeve to the outer intermediate sleeve.

In the annular space (35) between the outer intermediate sleeve (24) and the outer sleeve (42), is generally bonded a cylinder of rubber, into which is molded the damping channel (36) connected to a first opening (38) in the outer intermediate sleeve (24) leading to the lower fluid chamber (30) and a second opening (40) in the outer intermediate sleeve (24) at the other end of the damping channel (36) leading to the upper fluid chamber (32). It is to be understood that while the damping channel is illustrated as a partially circumferential groove, it can in fact encompass a spiral groove having a plurality of revolutions. The actual configuration would depend upon the damping characteristics to be achieved. This inertial damping channel (36) is in contrast to orifice type damping. Inertial damping relies on the mass of a column of fluid oscillating within the channel. The channel is particularly designed to maintain the flow of fluid in the laminar region. By contrast, orifice or viscous damping generally suffers from problems during high frequency vibrations. Orifice damping is also hard to tune for specific frequencies and generally results in noisy, turbulent flow, which noise may be transmitted back to the engine compartment of a vehicle.

In operation, when the inner metal is displaced vertically, relative to the outer sleeve, fluid is displaced from one chamber to another. In the case of small amplitude vibrations, the movement takes place via the decoupling device until such time as the rubber plate or diaphragm is forced either to the top or the bottom perforated plate, thus covering the perforations and in turn forcing the fluid to pass through the damping channel. With the occurrence of these larger amplitude vibrations, the fluid passes through the damping channel, and in the case of oscillating displacements, the fluid oscillates in the damping channel giving inertial damping.

While certain representative embodiments and details have been shown for the purpose of illustrating the invention, it will be apparent to those skilled in the art that various changes and modifications may be made therein without departing from the spirit or scope of the invention.

What is claimed is:

1. A bush type mounting device (10) having inertial hydraulic damping and internal hydraulic decoupling comprising:
   (a) an outer sleeve (42);
   (b) an intermediate sleeve (21), radially inward from said outer sleeve (42) defining an annular space (35) therebetween;
   (c) an inner metal (12) portion formed within said intermediate sleeve (21);
   (d) a rubber spring bonded to an outer surface of said inner metal (12) on one side of said rubber spring (16) and to an inner surface of said intermediate sleeve (21) on another side of said rubber spring (16) diametrically located to divide said intermediate sleeve (16) into a lower fluid chamber (30) and an upper fluid chamber (32), each containing a fluid;
   (e) an inertial damping channel (36) located within said annular space (35); and
   (f) means for hydraulically decoupling (26) said fluid between said lower chamber (30) and said upper chamber (32), wherein said inner metal portion (12) is tubular in shape, oriented axially within said intermediate sleeve (21), has an aperture (14) therethrough in its axial direction and has a decoupling channel (28) connecting said lower chamber and said upper chamber.

2. The bush type mounting device according to claim 1 wherein said means for hydraulically decoupling is located at one end of said decoupling channel.

3. The bush type mounting device according to claim 2 where said means for hydraulically decoupling is comprised of a pair of perforated plates (27) separated by a gap and a rubber plate (29) being thinner than said gap and located therein.

4. The bush type mounting device according to claim 3 wherein said rubber spring is further comprised of a lower bump stop (18) and an upper bump stop (20), each bump stop providing for the continuation of said decoupling channel (28).

5. The bush type mounting device according to claim 4 wherein said intermediate sleeve (21) is comprised of an inner intermediate sleeve (22) and an outer intermediate sleeve (24) wherein said outer intermediate sleeve has a first opening (38) to connect the damping channel (36) to the lower fluid chamber (30) and a second opening (40) to connect the damping channel (36) to the upper fluid chamber (32).

6. The bush type mounting device according to claim 2 wherein said means for hydraulically decoupling (26) is comprised of a pair of perforated plates (27) and a diaphragm (31) held between said plates.

7. The bush type mounting device according to claim 6 wherein said rubber spring is further comprised of a lower bump stop (18) and an upper bump stop (20), each bump stop providing for the continuation of said decoupling channel (28).

8. The bush type mounting device according to claim 7 wherein said intermediate sleeve (21) is comprised of an inner intermediate sleeve (22) and an outer intermediate sleeve (24) wherein said outer intermediate sleeve has a first opening (38) to connect the damping channel (36) to the lower fluid chamber (30) and a second opening (40) to connect the damping channel (36) to the upper fluid chamber (32).

* * * * *